US012401957B2

(12) United States Patent
Kirchhoff

(10) Patent No.: US 12,401,957 B2
(45) Date of Patent: Aug. 26, 2025

(54) SOCKET CONNECTOR FOR A HEARING DEVICE

(71) Applicant: GN Hearing A/S, Ballerup (DK)

(72) Inventor: Laurids Egedal Kirchhoff, Copenhagen (DK)

(73) Assignee: GN HEARING A/S, Ballerup (DK)

(*) Notice: Subject to any disclaimer, the term of this patent is extended or adjusted under 35 U.S.C. 154(b) by 0 days.

(21) Appl. No.: 18/527,762

(22) Filed: Dec. 4, 2023

(65) Prior Publication Data

US 2024/0107244 A1 Mar. 28, 2024

Related U.S. Application Data

(63) Continuation of application No. 18/120,922, filed on Mar. 13, 2023, now Pat. No. 11,937,051, which is a continuation of application No. 17/377,301, filed on Jul. 15, 2021, now Pat. No. 11,653,161.

(30) Foreign Application Priority Data

Aug. 18, 2020 (DK) ........................... PA 2020 70538

(51) Int. Cl.
*H04R 25/00* (2006.01)
*H01R 13/52* (2006.01)
*H01R 13/627* (2006.01)

(52) U.S. Cl.
CPC ......... *H04R 25/65* (2013.01); *H01R 13/5219* (2013.01); *H01R 13/6271* (2013.01); *H04R 2225/021* (2013.01)

(58) Field of Classification Search
CPC ........................... H04R 25/65; H04R 13/5219; H04R 13/6271; H04R 2225/021
See application file for complete search history.

(56) References Cited

U.S. PATENT DOCUMENTS 8,259,977 B2 9/2012 Jørgensen et al.
2011/0194717 A1 8/2011 Hansen et al.
2013/0004005 A1 1/2013 Barth et al.
2013/0279728 A1 10/2013 Chan et al.
(Continued)

FOREIGN PATENT DOCUMENTS

EP 2521378 11/2012
EP 3503587 6/2019
(Continued)

OTHER PUBLICATIONS

Non-Final Office Action for U.S. Appl. No. 18/120,922 dated Jul. 18, 2023.
(Continued)

*Primary Examiner* — Sunita Joshi
(74) *Attorney, Agent, or Firm* — Vista IP Law Group, LLP

(57) ABSTRACT

The present disclosure relates to a socket connector for a hearing device. The hearing device comprises a Behind-The-Ear (BTE) unit and a Receiver-In-the-Ear (RIE) unit, the BTE unit comprising a frame, wherein the frame comprises electronic components of the BTE unit, the RIE unit comprising a plug connector configured for providing an electrical connection between the RIE unit and the BTE unit. The socket connector is connectable to the frame of the BTE unit and is configured for detachably connecting the plug connector to the frame.

34 Claims, 6 Drawing Sheets

(56) References Cited

U.S. PATENT DOCUMENTS

Figure 1A:
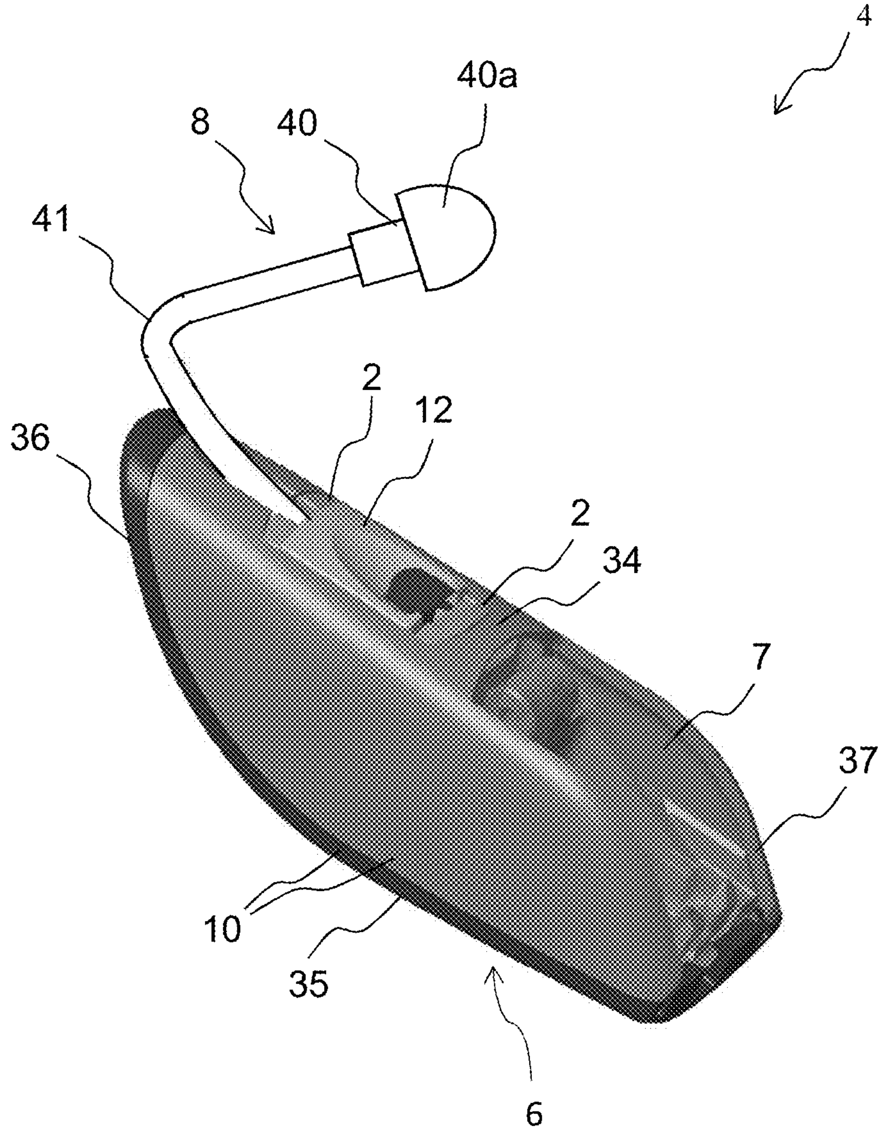

| | | | |
|---|---|---|---|
| 2014/0003638 A1 | 1/2014 | Barth et al. | |
| 2014/0205120 A1 | 7/2014 | Barth et al. | |
| 2015/0163607 A1 | 6/2015 | Harte et al. | |
| 2016/0249142 A1 | 8/2016 | Beyfuss et al. | |
| 2018/0343525 A1 | 11/2018 | Karlsen et al. | |
| 2020/0204933 A1* | 6/2020 | Higgins | H04R 1/1075 |

FOREIGN PATENT DOCUMENTS

| | | | |
|---|---|---|---|
| EP | 3503587 A1 * | 6/2019 | H01R 13/62 |
| WO | WO 2012/149963 | 11/2012 | |

OTHER PUBLICATIONS

Notice of Allowance for U.S. Appl. No. 18/120,922 dated Nov. 15, 2023.

Non-Final Office Action for U.S. Appl. No. 17/377,301 dated Sep. 21, 2022.

Notice of Allowance for U.S. Appl. No. 17/377,301 dated Jan. 11, 2023.

Foreign Office Action dated Feb. 2, 2021 for Danish patent application No. PA 2020 70538.

Extended European Search Report for EP 21184283.6 dated Dec. 20, 2021.

Foreign Exam Report for EP Patent Appln. No. 21184283.6 dated Feb. 12, 2024.

* cited by examiner

SOCKET CONNECTOR FOR A HEARING DEVICE

RELATED APPLICATION DATA

This application is a continuation of U.S. patent application Ser. No. 18/120,922, filed on Mar. 13, 2023,which is a continuation of U.S. patent application Ser. No. 17/377,301 filed on Jul. 15, 2021, now U.S. Pat. No. 11,653,161, which claims priority to, and the benefit of, Danish Patent Application No. PA 2020 70538 filed on Aug. 18, 2020. The entire disclosure of the above application is expressly incorporated by reference herein.

FIELD

The present disclosure relates to hearing devices. More specifically, the disclosure relates to a socket connector for the hearing devices.

BACKGROUND

Hearing devices may comprise different modules/units that may be connected by a plug and socket connector. For example, a hearing device may comprise a Behind-The-Ear (BTE) unit which, by means of a plug and socket connector, may be connected to an in-the-ear unit, typically a Receiver-In-the-Ear (RIE) unit. A hearing device comprising different parts provides that a user can disassemble the hearing device into the different parts, such that for example a user can clean a specific part or exchange a part without necessarily having to discard the complete hearing device. Typically, a RIE unit may be changed after a year or two, while a BTE unit may be used for a longer time.

However, it is a problem that a hearing device, which comprises different parts, may be more likely to malfunction when/if the different parts are not properly and securely interlocked to each other and if the electronics inside the BTE unit and RIE unit are not isolated from outside factors such as moisture and dirt. Furthermore, each type or brand or generation of hearing devices normally require a new connection interface, in case that the connector is implemented in e.g. the housing of the BTE unit.

There is a need for an improved hearing device comprising a universal connection interface suitable for use in different types of hearing devices comprising a BTE and RIE unit. Furthermore, there is a need for a hearing device in which at least a RIE unit can be exchanged. Furthermore, there is a need for a hearing device in which the electronics inside the BTE unit and RIE unit is protected from outside factors such as moisture and dirt.

SUMMARY

It is an object to provide a universal connection interface for interconnecting BTE and RIE units of any hearing device.

It is another object to provide a connection interface which will ensure protection of electronic components placed inside a BTE unit and/or electrical interfaces on a RIE unit from external factors.

It is a further object to provide a connection interface which would enable easy exchange of a housing of a BTE unit as well as of a RIE unit.

It is a further object to provide a connection interface allowing the use of BTE unit housings and RIE unit plug connectors having a reduced cost.

It is yet a further object to provide sealing between an interconnecting connection interface and a housing of a BTE unit as well as sealing between the interconnecting connection interface and a plug connector connecting the BTE and RIE units of a hearing device.

In a first aspect, a socket connector for a hearing device is disclosed. The hearing device comprises a Behind-The-Ear (BTE) unit and a Receiver-In-the-Ear (RIE) unit. The BTE unit comprises a frame, wherein the frame comprises electronic components of the BTE unit. The RIE unit comprises a plug connector. The plug connector is configured for providing an electrical connection between the BTE and RIE units. The socket connector is connectable to the frame of the BTE unit. The socket connector is configured for detachably connecting/attaching the plug connector to the frame.

The socket connector may be understood as a separate part/unit which mechanically connects the RIE unit, i.e. the plug connector, to the BTE unit, i.e. the frame of the BTE unit.

The socket connector is configured for detachably connecting/attaching the plug connector to the frame of the BTE unit. Such configuration provides a modularity where the different parts, i.e. different RIE units and different frames, may be used crosswise. Further, the socket connector may be used for different types, brands, generations of hearing devices.

The hearing device may be a headset or a hearing aid. The hearing device comprises a BTE unit and a RIE unit. The BTE unit typically comprises most of the electronics of the hearing device except for the receiver. The hearing device may comprise a first input transducer, e.g. a microphone, to generate one or more microphone output signals based on a received audio signal. The audio signal may be an analogue signal. The microphone output signal may be a digital signal. Thus, the first input transducer, e.g. microphone, or an analogue-to-digital converter, may convert the analogue audio signal into a digital microphone output signal. All the signals may be sound signals or signals comprising information about sound. The hearing device may comprise a signal processor. The one or more microphone output signals may be provided to the signal processor for processing the one or more microphone output signals. The signals may be processed such as to compensate for a user's hearing impairment. The signal processor may provide a modified signal. All these components may be comprised in a housing of the BTE unit. The hearing device may comprise a receiver or output transducer or speaker or loudspeaker. The receiver may be connected to an output of the signal processor. The receiver may output the modified signal into the user's ear. The receiver, or a digital-to-analogue converter, may convert the modified signal, which is a digital signal, from the processor to an analogue signal. The receiver may be comprised in the RIE unit. The RIE unit may comprise an additional microphone and/or one or more sensors, such as one or more bio sensors. Thus, the additional microphone and/or speaker and/or one or more sensors may be located in the RIE unit rather than in the BTE unit. The hearing device may comprise more than one microphone, and the BTE unit may comprise at least one microphone and the RIE unit may also comprise at least one microphone.

The hearing device signal processor may comprise elements such as an amplifier, a compressor and/or a noise reduction system etc. The signal processor may be implemented in a signal-processing chip or a printed circuit board (PCB). The hearing device may further have a filter function, such as compensation filter for optimizing the output signal.

The hearing device may furthermore comprise a wireless communication unit, such as a wireless communication circuit, for wireless data communication interconnected with an antenna, such as an radio frequency (RF) antenna or a magnetic induction antenna, for emission and reception of an electromagnetic field. The wireless communication unit including a radio or a transceiver, may connect to the hearing device signal processor and the antenna, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

The hearing device may be any hearing device, such as any hearing device compensating a hearing loss of a wearer of the hearing device, or such as any hearing device providing sound to a wearer, or such as a hearing device providing noise cancellation, or such as a hearing device providing tinnitus reduction/masking. The person skilled in the art is well aware of different kinds of hearing devices and of different options for arranging the hearing device in and/or at the ear of the hearing device wearer.

For example, the hearing device may be a Receiver-In-Canal (RIC) or Receiver-In-the-Ear (RIE or RITE) type hearing device, in which a receiver is positioned in the ear, such as in the ear canal, of a wearer during use, for example as part of an in-the-ear unit, while other hearing device components, such as a processor, a wireless communication unit, a battery, etc. are provided as an assembly and mounted in a housing of a Behind-The-Ear (BTE) unit. A plug and socket connector connects the BTE unit and the RIE unit.

The hearing device comprises the BTE unit. The BTE unit may comprise a housing wherein the frame is arranged in the housing. The frame typically supports electronic components of the BTE unit. The frame may comprise a printed circuit board (PCB) and/or other electronic components. The frame is normally dimensioned such that the frame, together with the components mounted thereon/therein, can be inserted into the housing. The socket connector may be fixed to the frame. The frame may comprise two separate units, i.e. a first frame unit and a second frame unit. The socket connector and/or the electronic components may be fixed to/within the frame during assembly of the first frame unit and the second frame unit. The first frame unit and the second frame unit may be provided with one or more connection/attachment means for connecting/attaching the first frame unit and the second frame unit to each other. The one or more connection/attachment means may be snap-fit connections. Alternatively the one or more connection/attachment means may be mechanical connection/attachment means, such as screws, or non-mechanical connection/attachment means, such as adhesives. Yet as an alternative the first frame unit and the second frame unit is kept together by the housing of the BTE unit.

The housing comprises an outer shell of the BTE unit and may have different shapes, different colours, and/or patterns. Naturally, the frame may also take different shapes and sizes according to the shape and size of the housing (or opposite). Also, the BTE unit may be sized for different types of batteries. The housing may comprise a bottom part comprising a bottom surface and a top part comprising a top surface opposite the bottom part. The housing may define a front part comprising a front surface and a rear part comprising a rear surface opposite the front part. The housing may have any size, shape and/or colour. Preferable, the housing of the BTE unit has an elongated or longitudinal or extended shape, such that the top part and the bottom part may be longer or more extended than the front part and rear part. Thus, the housing may extend in a longitudinal direction. The housing may be comprised of two separate units, i.e. a top housing and a bottom housing. The top housing may at least comprise the top part and optionally the rear part and/or the front part. The bottom housing may at least comprise the bottom part and optionally the rear part and/or the front part. The housing may be configured to be worn behind the ear of a user, and the housing may be oriented such that the top part faces substantially upwards and the bottom part faces substantially downwards, i.e. faces the ear of the user, when the hearing device is worn in its operational position in or at the ear of the user. The top part and the bottom part may be substantially horizontal parts when the hearing device is worn in its operational position in or at the ear of the user. The front part and rear part may be substantially vertical parts when hearing device is worn in its operational position in or at the ear of the user. The top housing and bottom housing may be provided with one or more connection/attachment means for connecting/attaching the top housing and the bottom housing to each other and/or the frame of the BTE unit. The one or more connection/attachment means may be snap-fit connections.

The housing of the BTE unit may be made from plastic material, such as any synthetic or semi-synthetic organic compounds that may be malleable or flexible and so may be moulded into a housing. The material may be a hard material or the material may be a soft material. The housing may be made of conducting material, such that the material may allow a flow of electrical current flowing in the material of the housing. The housing may comprise a mix of materials, such that one or more parts or sections or elements of the housing may be made from one material, while another one or more parts or sections or elements of the housing may be made from another material. The housing may comprise a guide for at least a part of the RIE unit. The guide may accommodate at least a part of the RIE unit, i.e. an electrical wire/tube of the RIE unit. At least part of the RIE unit, i.e. the electrical wire/tube, may be provided or arranged in or within the guide. The guide may be configured for guiding, directing, conveying, securing, retaining etc. at least a part of the RIE unit.

The hearing device comprises a RIE unit. The RIE unit typically comprises an earpiece, a plug connector, and an electrical wire/tube connecting the plug connector and earpiece. The earpiece may comprise an in-the-ear housing, a receiver, such as a receiver configured for being provided in an ear of a user and/or a receiver being configured for being provided in an ear canal of a user, and an open or closed dome. The dome may support correct placement of the earpiece in the ear of the user. The RIE unit may comprise a microphone, a receiver, one or more sensors, and/or other electronics. Some electronic components may be placed in the earpiece, while other electronic components may be placed in the plug connector. The receiver may be with a different strength, i.e. low power, medium power, or high power. The electrical wire/tube provides an electrical connection between electronic components provided in the earpiece of the RIE unit and electronic components provided in the BTE unit. The electrical wire/tube as well as the RIE unit itself may have different lengths.

The hearing device comprises a plug connector forming part of the RIE unit. The plug connector may be configured to be removably attached to the frame of the BTE unit by means of the socket connector. In other words, the plug connector may removably or releasably be attached or fixed or mounted or fastened or interconnected to or with the socket connector and thereby the frame. The plug connector may be mechanically fixed to the socket connector and thereby the frame. The plug connector may provide a mechanical fixation with the socket connector. The plug connector may engage with or be engaged with the socket connector and the frame. The socket connector together with the plug connector forms a plug and socket connector which provides a connection interface between the RIE unit and the BTE unit. The socket connector, and thereby the plug connector, may be arranged in the frame such that they appear on the bottom part of the housing. Alternatively, the socket connector and the plug connector may be arranged in the top part or the front part or the rear part of the housing. When arranging the socket connector, unoccupied space in the hearing device is normally taken into account.

The plug connector is configured for electrically connecting the RIE unit to the BTE unit. The plug connector may comprise a first electrical connection interface and the BTE unit, i.e. the frame, may comprise a second electrical connection interface. The first and second electrical connection interfaces may be configured for providing an electrical connection between the RIE unit and the BTE unit, such as between the plug connector of the RIE unit and the frame of the BTE unit.

The socket connector for the hearing device provides the advantage that the RIE unit including the plug connector and/or the housing of the BTE unit may be exchangeable parts of the hearing device. Namely, a hearing device user or a hearing care professional may exchange the housing any time without having to change the main electronics of the BTE unit. The user may also exchange the RIE unit by detaching the plug connector from the socket connector.

It is an advantage that the socket connector is detachably connected to the plug connector, since this provides that the plug connector together with the RIE unit may deliberately or intentionally be detached from the BTE unit for, e.g., replacement or for cleaning one or more parts of the RIE unit.

In some embodiments, the socket connector may be configured to fit with a plurality of different RIE units comprising the plug connector. Different RIE units may have the same mechanical connection interface, i.e. plug connector, configured for mechanical connection with the socket connector. The electronics in the plug connector and a plug connector electrical connection interface, such as the first electrical connection interface, may vary. Such an arrangement allows for use of one universal socket connector/connection interface with different RIE units.

In some embodiments, the plug connector may comprise a locking element. The socket connector may be configured for interacting with the locking element. The locking element may be configured for locking the plug connector to or in the socket connector when at least a part of the plug connector is arranged in the socket connector. It is an advantage that the locking element may provide that the RIE unit is securely attached to the BTE unit. It is a further advantage that the locking element may provide that the plug connector may be securely removed from the socket connector, such as removed from the socket connector without breaking the plug connector or the socket connector. The material selection for the locking element is typically made so that in an unintended use-case where the user pulls out the RIE unit with force, it is the locking element that breaks not the socket connector. In such scenario a new RIE unit can be inserted and the hearing device would work properly again. It is preferred that the RIE unit is released from the socket connector when it is pulled with a force above 6 N, such as above 10 N. The advantage is that the hearing device is not broken so no repair is needed to the hearing device. The locking element may be a separate deadbolt movably arranged in the plug connector as disclosed in EP3503587A. The deadbolt may be made from a thermoplastic material being softer than the thermoplastic material used for the base element of the socket connector, such as Polyoxymethylene (POM), by injection moulding. The socket connector may comprise an undercut configured to receive the locking element, such as the deadbolt.

In some embodiments, the socket connector may be configured to fit with a plurality of different frames. The frame is typically a part of the BTE unit which matches the shape and size of the housing. Naturally, the frame may have different shapes and sizes and the socket connector can be configured to fit with all different variations of the frame. Different frames may have the same mechanical connection interface configured for mechanical connection with the socket connector. Such an arrangement also allows for use of the one universal socket connector/connection interface with different frames and thereby different housings.

In some embodiments, the socket connector may comprise one or more attachment points for connection to the frame. The attachment points may be configured for attachment and/or interconnection and/or fixation of the socket connector to the frame. The attachment point may be in a form of protrusions or hooks. The attachment points of the socket connector may abut an inner surface of the frame and/or be arranged in an undercut in the frame. The attachment points improve the strength of the attachment and also improve design tolerances of both the socket connector and the frame.

In some embodiments where the BTE unit comprises a housing, the socket connector may be configured to fit with a plurality of different housings. Different housings may have the same interface configured for receiving the socket connector. Typically, the housing, i.e. the outer shell, is new for each hearing device. It is an advantage to have a socket connector to fit with different housings as it also allows the use of one universal socket connector/connection interface in different types of hearing devices.

In some embodiments, the socket connector may be configured to be removably arranged/received in a hole in the housing. The housing may define a hole for arranging/receiving the socket connector when the housing is attached to and/or around the frame of the BTE unit. The hole of the housing may be provided in the bottom part of the housing. It is an advantage that the socket connector is not directly attached to the housing as this allows the housing to be replaced without having to replace the entire hearing device, its electronics, or the socket connector which may be made from high quality materials. The socket connector received/arranged in the hole in the housing may not occupy any additional space which would otherwise be reserved for some electronic components of the BTE unit. In other words, it is an advantage that the socket connector may be provided in a hole of the housing which would in any case exist for attachment of the plug connector.

In some embodiments, the socket connector may be configured for sealing against moisture and dirt, for protecting electronic components of the BTE unit and plug connector against corrosion. Namely, the socket connector provides a seal between itself and the plug connector as well as between itself and the housing of the BTE unit. In the present context, the term sealing is to be interpreted as creating a blocking between two parts (socket connector—plug connector, and socket connector—housing) so as to prevent anything from passing between them. The socket connector may seal the electronic components including the first and second connection interface, such that these are protected from water, sweat, salt, etc. coming from the outside. By providing the sealing by the socket connector (and not by the housing or plug connector), the housing and plug connector may be made as cheaper parts. Thus, the manufacturing of the plug connector and the different housings is simplified and less complex and allows for use of simpler and cheaper manufacturing tools requiring less maintenance. Yet further, new products and housings with different designs are also easier and cheaper to produce.

In some embodiments, the socket connector may comprise a base element and at least one of a first sealing element or a second sealing element. The base element may provide stability, strength, rigidity, and/or shape for the socket connector while the first and/or second sealing element may provide sealing against moisture and dirt. The base element and the first/second sealing element may form an integral part. The base part may be a rigid part suitable for detachably connecting the plug connector to the frame of the BTE unit. According to some embodiments, the BTE housing and RIE unit may be exchangeable parts while the frame and socket connector may not be exchangeable parts of the hearing device.

In some embodiments, the first sealing element may be configured for providing sealing between the housing and the socket connector, e.g. the base element of the socket connector, and the second sealing element may be configured for providing sealing between the plug connector and the socket connector, e.g. the base element of the socket connector. Thus, double sealing is achieved by the socket connector. The first and/or second sealing element may each comprise a sealing lip configured for being compressed/flattened between walls/surfaces when the socket connector is received in the housing of the BTE unit and/or when the plug connector is received in the socket connector. The first and/or second sealing element may thus be configured for providing a face seal. The first and/or second sealing element may thus be configured as a static seal being subject to a preload to help attain the sealability. Preload occurs when the seal height is designed to be greater than the sealing gap. Under compression, the first and/or second sealing element is elastically deformed, producing internal stresses and generating a reaction force on respectively a wall/surface of the socket connector and the housing of the BTE unit and/or the plug connector. The first and/or second sealing element may be configured for being compressed 5 to 30%, such as 10 to 25%, such as about 20%. Furthermore, there are no requirements on the plug connector and the housing to provide sealing, what normally makes these parts more expensive and more complex in manufacturing. Having only one component, i.e. the socket connector, for providing the seal, the overall manufacturing complexity of the hearing device is reduced, as well as the cost. Namely, the only component which may require special attention during manufacturing is the socket connector while other components are significantly simplified. Even though the socket connector may be complex, it is beneficial to have a versatile component which can be used in many different types and brands of hearing devices. Additionally, it is cheaper to exchange the housing and the RIE unit, which may often need to be changed for various reasons.

In some embodiments, the first sealing element and the second sealing element may be integrated in one sealing part proving sealing between the housing and the socket connector and between the plug connector and the socket connector. Thus the first and second sealing element may form one sealing element. Achieving the sealing with only one integral part may reduce the complexity of the socket connector and/or strengthen the sealing elements.

In some embodiments, the first sealing element may be adhesively and/or mechanically connected to the base element. In some embodiments, the second sealing element may be adhesively and/or mechanically connected to the base element. In some embodiments, both the first and second sealing element may be adhesively and/or mechanically connected to the base element such that all the parts essentially form one piece, i.e. the socket connector. Alternatively, the first and/or second sealing element may be chemically bonded to the base element.

In some embodiments, the first sealing element may be moulded to the base element. In some embodiments the second sealing element may be moulded to the base element. In some embodiment, both the first and second sealing element may be moulded to the base element. The first and/or second sealing element may be moulded to the base element by using 2K injection moulding. During 2K injection moulding, two or more different materials are moulded together into one plastic part, i.e. by first moulding the base element and thereafter moulding the first and/or second sealing element directly on the base element. Therefore, when using 2K injection moulding, the socket connector is essentially manufactured as one integral part. The first and second sealing elements may be made of the same material. 2K injection moulding is a well-established process which can create fine structures with a lot of features, curves, edges, protrusions, etc., what may be required for the socket connector design.

In some embodiments, the base element of the socket connector may comprise inside walls and outside walls. The base element may be shaped as a circle, an oval, a rectangle, etc., with a hole in the centre part. The inside walls may then define the hole, while the outside walls may define the overall shape of the socket connector.

In some embodiments, the inside walls of the base element may form a hole in the socket connector. The hole may be a bore or a through hole allowing an electrical connection between the plug connector and electronic components of the BTE unit, i.e. connection between first and second electrical connection interfaces. The inside walls may point inwards, towards the plug connector, when the plug connector is arranged in the hole of the socket connector. The outside walls of the base element may point towards the housing, when the socket connector is arranged in the hole of the housing.

In some embodiments, the first and/or second sealing element of the socket connector is/are arranged to at least partly or completely surround respectively the inside walls and the outside walls of the base element. Such arrangement results in the first and second sealing elements being provided both on at least a part of the inside walls of the socket connector, i.e. on the circumference of the hole defined in the socket connector, and on at least a part of the outside walls of the socket connector, i.e. on the outer circumference of the socket connector. The first and/or second sealing element of the socket connector may thus be configured for providing a circumferential sealing respectively along the inside and outside walls of the base element of the socket connector. The first and/or second sealing element may also be provided in the bottom side of the sealing socket, i.e. a portion which may abut the frame of the BTE unit.

In some embodiments, the sealing between the plug connector and the inside walls of the base element of the socket connector may be provided by the second sealing element. The sealing is achieved by the second sealing element which is configured for providing a seal between the plug connector and at least a portion of the inside walls of the base element. The sealing between housing and the outside walls of the base element of the socket connector may be provided by the first sealing element.

This is achieved by the first sealing element being configured as a seal arranged between the housing and at least a portion of the outside walls of the base element.

In some embodiments, the base element and respectively the first sealing element and/or the second sealing element of the socket connector may be made of different materials. Typically, the base element may be made of a rigid material while the sealing elements are made of a material softer than the base element. The base element may be rigid as it is normally fixed to the frame and as it provides stability to the entire socket connector. The sealing materials are made of softer materials such that a seal can be formed.

In some embodiments, the first sealing element and/or the second sealing element may be made of an elastomer, such as a thermoplastic elastomer, such as silicone. The sealing elements may be made of a rubbery/flexible substance thereby defining flexible seal. Thermoplastic elastomers (TPE), sometimes referred to as thermoplastic rubbers, are a class of copolymers or a physical mix of polymers (usually a plastic and a rubber) that consist of materials with both thermoplastic and elastomeric properties. The elastomer used for the sealing elements may have hardness in a range between 30-80 shore durometers. In addition to the sealing function, the sealing elements may damp external vibrations which may possibly influence functioning of the hearing device, in particular when the hearing device is dropped on a hard surface, improving the overall robustness of the hearing device. Additionally, due to high flexibility of the sealing elements, fabrication tolerances are increased for the parts of the housing and the plug connector which abuts to the socket connector.

In some embodiments, the base element may be made of plastic, such as rigid/hard plastics, such as fiber reinforced thermo-plastics. The base element may ensure stability and rigidity of the socket connector, as well as give support to the sealing elements. The two materials may be moulded together such that the base element is made first and then the soft sealing elements are moulded to the base element in a 2K process. Alternatively, the two materials may be adhesively or mechanically attached to each other. In yet one alternative, the two materials may be chemically bonded to each other e.g. by applying heat. After the two materials are attached to each other, the socket connector appear as one component. It is to be noted that the first and second sealing element may be made of the same or different thermoplastic elastomers with the same or different hardness.

In a second aspect, a hearing device is disclosed. The hearing device comprises a socket connector, a Behind-The-Ear (BTE) unit and a Receiver-In-the-Ear (RIE) unit. The BTE unit comprises a frame and the RIE unit comprises a plug connector. The frame comprises electronic components of the BTE unit. The plug connector is configured for providing an electrical connection between the RIE unit and the BTE unit. The socket connector is connectable to the frame of the BTE unit and is configured for detachably connecting/attaching the plug connector to the frame.

In some embodiments, the hearing device comprises a socket connector according to the first aspect.

The present disclosure relates to different aspects including the socket connector described above and in the following, and a corresponding hearing device, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTIONS OF THE DRAWINGS

Figure 1B:
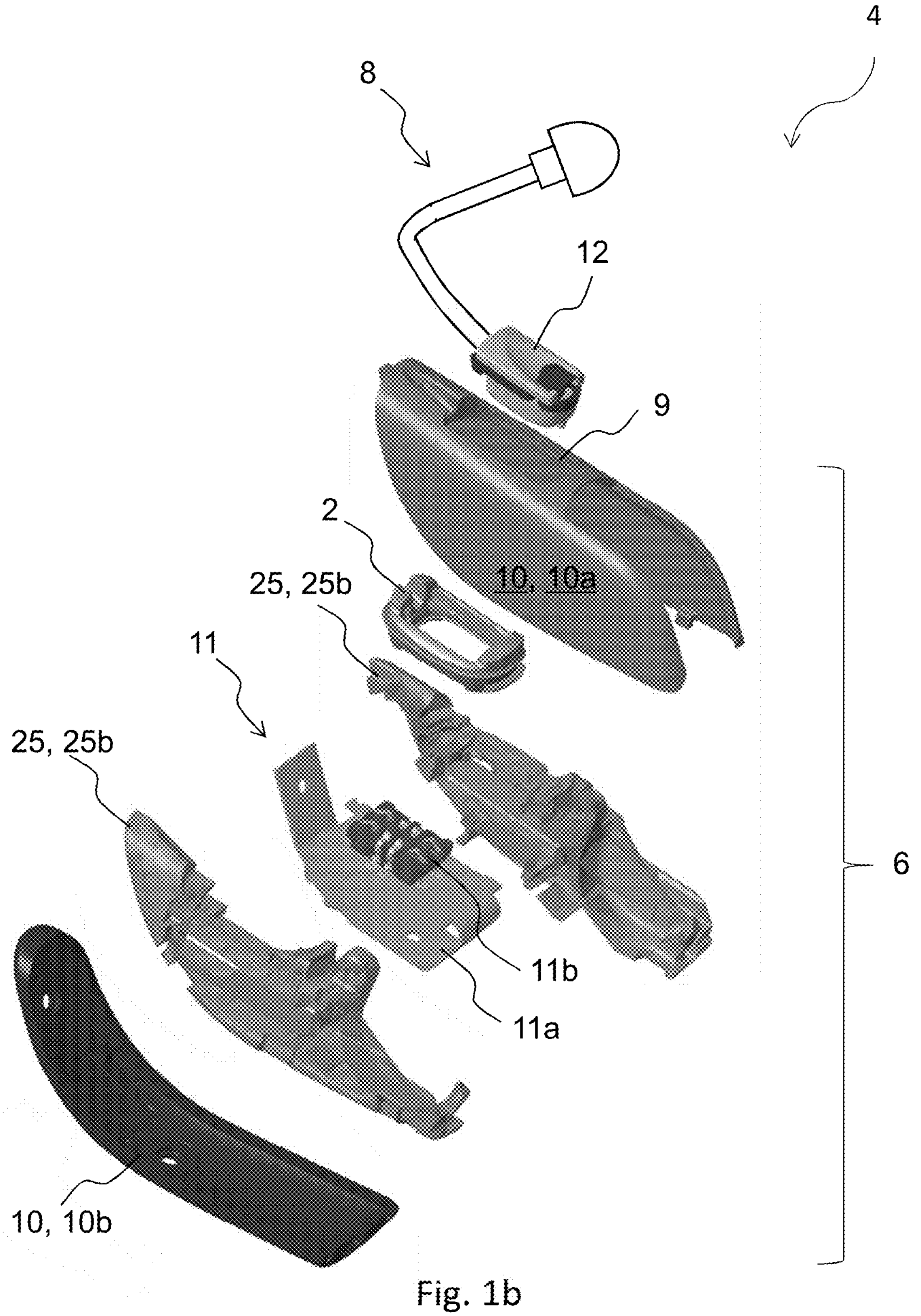
Figure 2A:
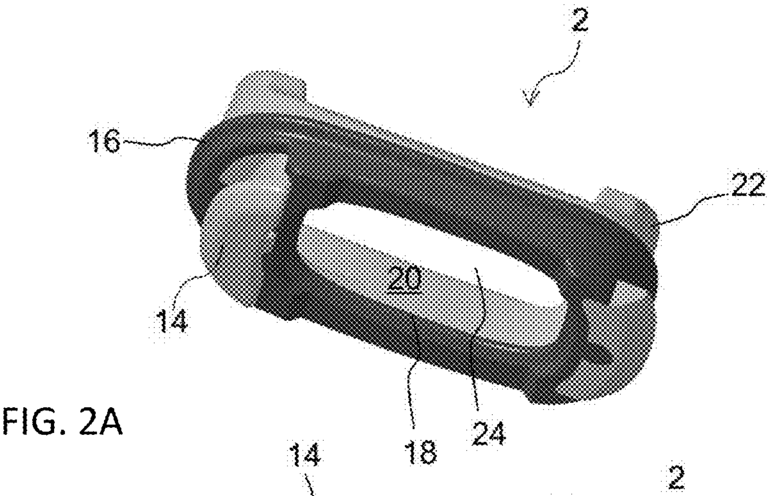
Figure 2B:
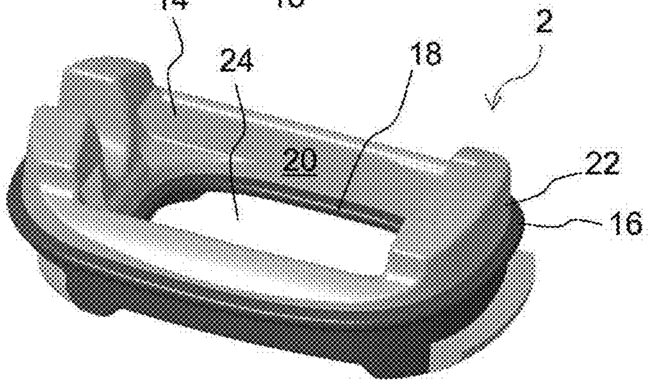
Figure 2C:
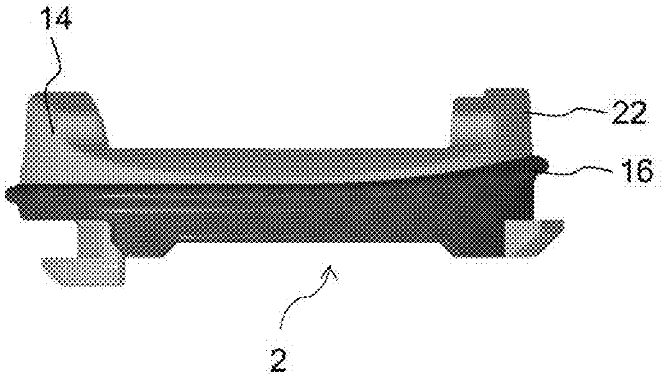
Figure 3:
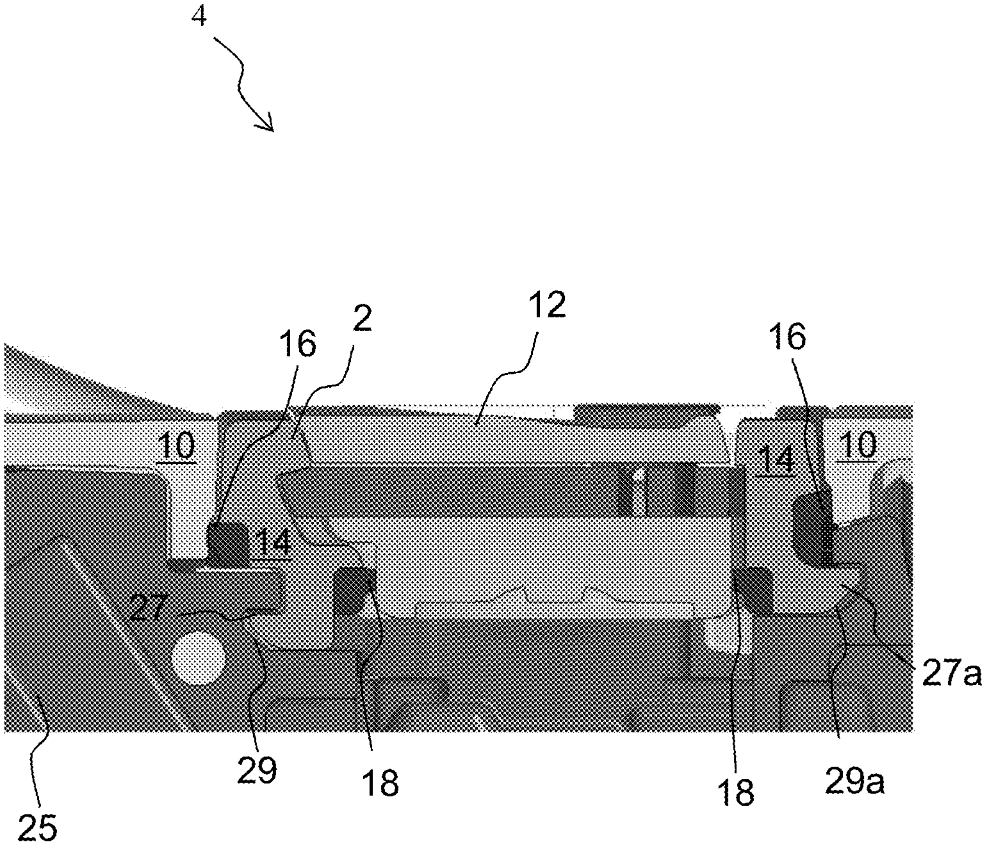
Figure 4A:
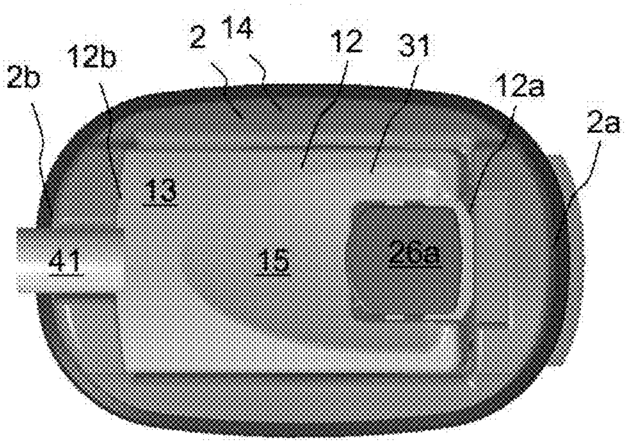
Figure 4B:
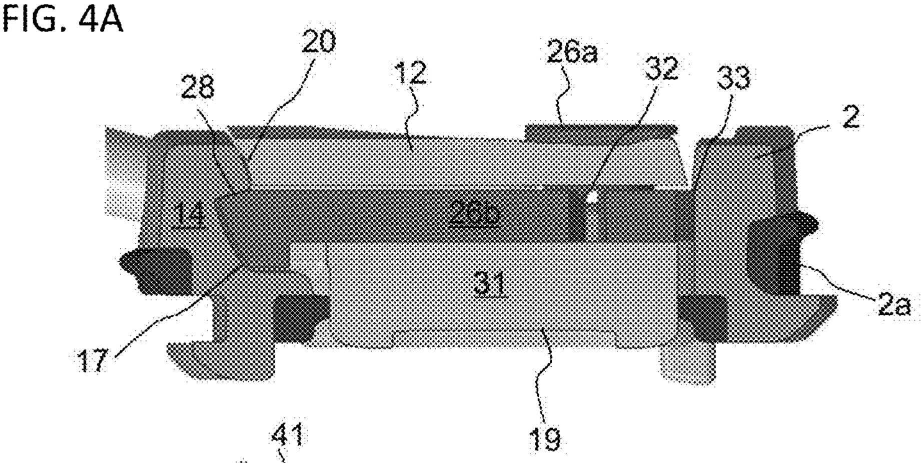
Figure 4C:
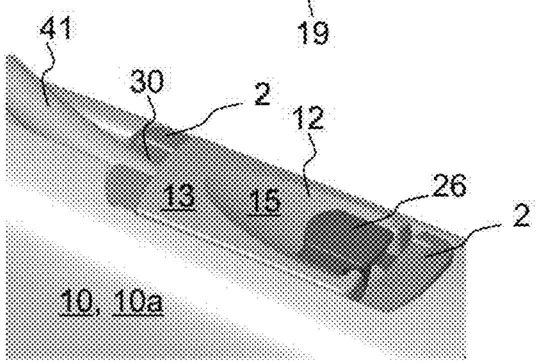
Figure 5:
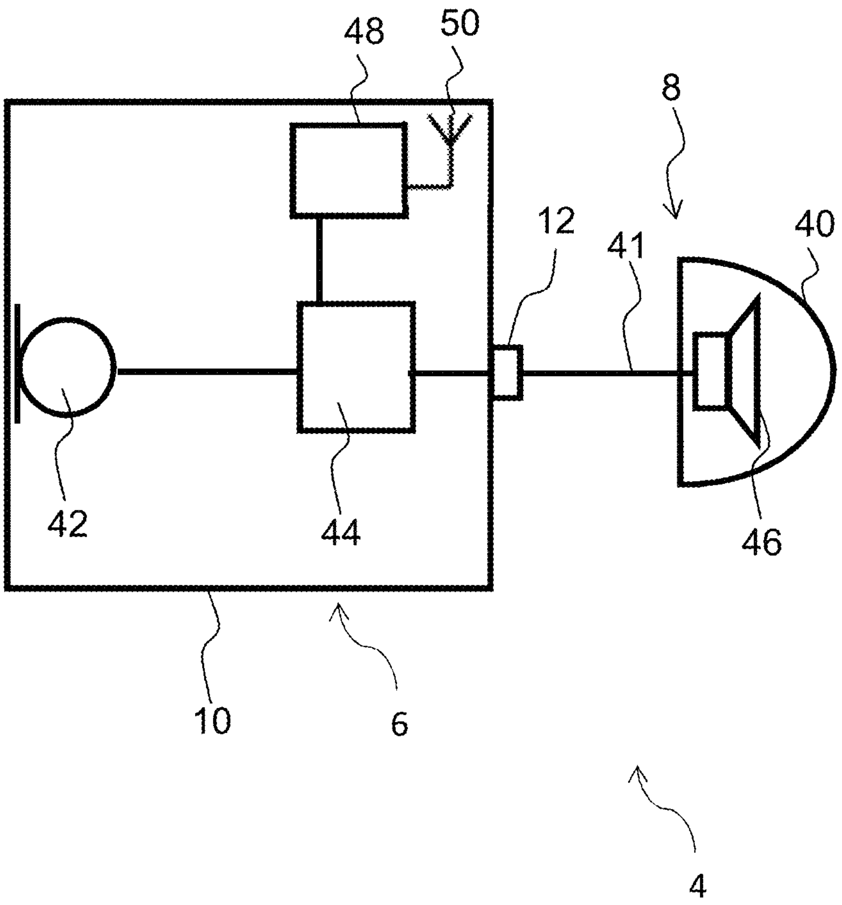

The above and other features and advantages will become readily apparent to those skilled in the art by the following detailed description of exemplary embodiments thereof with reference to the attached drawings, in which:

FIGS. 1*a* and 1*b* schematically illustrates an exemplary hearing device having a socket connector in respectively an assembled and an exploded view, FIGS. 2*a*, 2*b* and 2*c* illustrate different perspective views of an exemplary socket connector, FIG. 3 schematically illustrates the socket connector attached to a frame of a BTE unit, FIGS. 4*a*, 4*b* and 4*c* schematically illustrates a socket connector, plug connector, and a locking element, and FIG. 5 schematically illustrates a block diagram of an exemplary hearing device.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIGS. 1*a* and 1*b* schematically illustrates an exemplary hearing device 4 having a socket connector 2 according to some embodiments. The hearing device 4 comprises a Behind-The-Ear (BTE) unit 6 and a Receiver-In-the-Ear (RIE) unit 8. The BTE unit 6 comprises a frame 25, wherein the frame 25 comprises electronic components 11 of the BTE unit 6. The RIE unit 8 comprises a plug connector 12. The plug connector 12 is configured for providing an electrical connection between the RIE unit 8 and the BTE unit 6. The plug connector 12 also provides a mechanical connection between the RIE unit 8 and BTE unit 6, i.e. via the socket connector 2. The socket connector 2 is connectable to the frame 25 of the BTE unit 6 and is configured for detachably connecting/attaching the plug connector 12 to the frame 25.

Furthermore the hearing device 4 comprises a housing 10 forming an outer shell of the BTE unit 6 around the frame 25. The housing 10 comprises a hole 9 configured for receiving the socket connector 2. The housing 10 comprise a bottom part 34 comprising a bottom surface and a top part 35 comprising a top surface opposite the bottom part 34. The housing defines a front part 36 comprising a front surface and a rear part 37 comprising a rear surface opposite the front part 36. The hole 9 is in the bottom part 34 of the housing 10.

The BTE unit 6 may as in the illustrated embodiment comprise a battery compartment 7 accessible via/through a battery door (not shown). The hearing device 4 may be a rechargeable hearing device with or without a battery door.

The RIE unit 8 may as in the illustrated embodiment further comprise an electrical wire/tube 41 and an earpiece 40. The electrical wire/tube 41 is configured for electrically connecting electronic components, such as a receiver as shown in FIG. 5, in the earpiece 40 with the plug connector 12. The earpiece 40 may comprise an open or closed dome 40*a*.

The exploded view in FIG. 1*b* particular illustrates how the housing 10 may be comprised of a bottom housing 10*a* and a top housing 10*b*, how the frame 25 may comprise a first frame unit 25*a* and a second frame unit 25*b* and how the electronic components 11 of the BTE unit 6 may comprise a printed circuit board 11*a* and a second electrical connection interface 11*b*. The plug connector 12 comprises a corresponding first electrical connection interface (not shown). During assembly of the hearing device 4 at the manufacturing site a frame 25 and electronic components 11 are selected according to predefined specifications of the particular hearing device and the socket connector 2 is interconnected/fixed to the frame 25 during assembly of the frame, i.e. when first frame unit 25*a* is mounted/interconnected/fixed to the second frame unit 25*b*. Hereafter, at the manufacturing site or at a hearing care professional, a housing 10 compatible with/suitable for the frame 25 is attached to/around the assembled frame, i.e. the top housing 10*b* and bottom housing 10*a* is mounted/interconnected/fixed to each other and/or the frame 25, such that the socket connector 2 is accessible through the hole 9 in the bottom housing 10*a*. Finally, the plug connector 12 of a RIE unit 8 may be detachable attached in the socket connector 2 by a hearing care professional or a user wherein the first and second electrical connection interface is aligned and electrical connected.

Such configuration provides a modularity where the different hearing device parts, i.e. different RIE units 8, different frames 25 and different housings 10, may be used crosswise. Further, the socket connector 2 may be used for different types, brands, generations of hearing devices.

FIGS. 2*a*, 2*b* and 2*c* illustrate different perspective views of an exemplary socket connector 2. The socket connector 2 may comprise a base element 14, a first sealing element 16, and a second sealing element 18. As shown in FIG. 3, the first sealing element 16 is configured for providing sealing between the housing 10 of the BTE unit 6 and the base element 14 of the socket connector 2 and the second sealing element 18 is configured for providing sealing between the plug connector 12 and the base element 14 of the socket connector 2. The first and second sealing elements 16 and 18 may each form a sealing lip, such as an circumferential sealing lip, extending from a surface or wall of the base element 14. The first and second sealing elements 16 and 18 may form an integral part and/or may be made of a flexible material, e.g. a thermoplastic elastomer (TPE). The base element 14 may be made of a material which is harder than the sealing elements. It may be a plastic material such as fiber reinforced thermos-plastics. All three parts 14, 16, 18 may be moulded together by 2K moulding. Alternatively, the first sealing element 16 and the second sealing element 18 may be adhesively and/or mechanically fixed to the base element 14. The base element 14 forms inside walls 20 and outside walls 22. The inside walls 20 of the base element 14 form a hole 24 in the socket connector 2. The first sealing element 16 is arranged on one of the outside walls 22 of the base element 14. The second sealing element 18 is arranged on one of the inside walls 20 of the base element 14. The hole 24 in the socket connector 2 is configured for receiving a plug connector, such as the plug connector 12 shown in FIGS. 1*a*, 1*b*, 3 and 4.

FIG. 3 schematically illustrates a section of a cross-section of a hearing device assembly 4 where the socket connector 2 is attached to a frame of a BTE unit. The BTE unit comprises a frame 25 which serves for arrangement of electronic components of the BTE unit (not shown). The socket connector 2 may be interconnected/fixed to the frame 25. The socket connector 2 comprises a number of attachment points for connection to the frame 25, e.g. a first hook 27 and a second hook 27*a* formed by the base element 14. The first and second hook 27 and 27*a* may be placed in undercuts 29 and 29*a* formed in the frame 25 during assembly of the frame 25. The attachment points improve the strength of the attachment and also improve design tolerances of both the socket connector 2 and the frame 25.

FIG. 3 also illustrates how the first sealing element 16 is compressed between a wall/surface of the socket connect 2, i.e. the base element 14 of the socket connector 2, and a wall/surface of the housing 10, i.e. an wall/surface of the hole 9 in the housing 10, when the socket connector 2 is received in the hole 9 of the housing 10. As well as how the second sealing element 18 is compressed between a wall/surface of the socket connect 2, i.e. the base element 14 of the socket connector 2, and a wall/surface of the plug connector when the plug connector 12 is received in the socket connector 2. The wall/surface of respectively the housing 10 and the plug connector 12 may be a substantially flat/planner wall/surface. The first and/or second sealing element 16 and 18 may be configured for being compressed 5 to 30%, such as 10 to 25%, such as about 20%.

FIGS. 4*a* and 4*b* schematically illustrates a socket connector 2, plug connector 12, and a locking element 26, i.e. a socket and plug connector according to some embodiments. FIG. 4*c* schematically illustrates a hearing device assembly comprising the socket connector 2, plug connector 12, and the locking element 26. FIG. 4*a* illustrates a top view of the socket connector 2 and the plug connector 12 detachable attached/locked in the socket connector 2 by the locking element 26. The socket connector 2 comprises a first end 2*a* and a second end 2*b*. The socket connector 2/base element 14 may have a longitudinal shape in a direction parallel with an axis extending between the first and the second end 2*a* and 2*b* of the socket connector 2. The plug connector 12 comprises a first end 12*a* being a free end, and a second end 12*b* being connected to the electrical wire/tube 41. The plug connector 12 comprises a main body 31 extending between the first and the second end 12*a* and 12*b* of the plug connector 12. The main body 31 may have a longitudinal shape in a direction parallel with an axis extending between the first and the second end 12*a* and 12*b* of the plug connector 12. The plug connector 12 may comprise the locking element 26. The locking element 26 is configured for detachable attaching/locking the plug connector 12 to or in the socket connector 2, when at least a part of the plug connector 12 is arranged in the socket connector 2. As also shown in FIG. 4*c* the plug connector 12 has an upper free surface 13 being flush with an outer surface of the socket connector 2 (and an outer surface of the housing 10 of the BTE unit) and has a convex surface area 15 allowing a user to release the plug connector 12 from the socket connector 2 just by sliding e.g. a nail along the convex surface area 15 and against a release knob 26*a* having an upper surface being flush with the upper free surface 13 of the plug connector 12. FIG. 4*b* shows a cross-section of the socket and plug connector 2 and 12 where the illustrated locking element 26 further comprises a deadbolt 26*b* movable within a slot 32 in the main body 31 of the plug connector 12 into an undercut 17 in the socket connector 2, such as a undercut 17 in the inside walls 20 of base element 14 provided in the second end 2*b* of the socket connector 2. A surface 28 of the undercut 17 between the locking element 26, i.e. the deadbolt 26*b*, and the socket connector 2 is angled. This angled surface 28 helps in cases when the plug connector 12 is, e.g., pulled allowing the locking element 26 to release from the socket connector 2 before the socket connector 2 gets possibly broken or impaired. The angled surface is dimensioned such that it does not allow an easy release of the plug connector 12 from the socket connector 2. FIGS. 4*a*, 4*b* and 4*c* shows that a direction of insertion of the plug connector 12 into the socket connector 2 may be in an angle between 5-80 degrees relative to a longitudinal direction of the socket connector 2 (or the housing 10). The direction of insertion is due to placement of the plug connector 12 in an undercut 33 in the first end 2*a* of the socket connector 2. Correct insertion/placement of the plug connector 12 into the socket connector 2 is facilitated by a guide 30 defined in the socket connector 2, such as the second end 2*b* of the socket connector 2, and optionally the housing 10, such as the bottom housing 10*a*. The guide 30 is configured for receiving the electrical wire/tube 41 extending from the second end 12*b* of the plug connector 12. The plug connector 12 is secured to the socket connector 2 by the locking element 26.

A first electrical connection interface (not shown) may be provided on/at a bottom surface 19 of the plug connector 12. The bottom surface 19 being opposite the upper free surface 13 of the plug connector 12

FIG. 5 schematically illustrates a block diagram of an exemplary hearing device 4. The hearing device 4 comprises a BTE unit 6 and a RIE unit 8.

The BTE unit 6 comprises a housing 10. The BTE unit 6 may comprise a first transducer, e.g. a microphone 42, to generate one or more microphone output signals based on a received audio signal. The one or more microphone output signals may be provided to a signal processor 44 for processing the one or more microphone output signals. The BTE unit 6 may furthermore comprise a wireless communication unit 48, such as a wireless communication circuit, for wireless data communication interconnected with an antenna 50, such as an radio frequency (RF) antenna or a magnetic induction antenna, for emission and reception of an electromagnetic field. The wireless communication unit 48, including a radio or a transceiver, may connect to the hearing device signal processor 44 and the antenna 50, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

The RIE unit 8 comprises a plug connector 12, an electrical wire/tube 41 and an earpiece 40. The plug connector 12 and electrical wire/tube 41 is configured to mechanically and electrically connect the earpiece 40 to the BTE unit 6. The earpiece 40 may comprise a receiver or speaker 46 for supplying a receiver output signal to the ear canal of the user. The receiver or speaker 46 may be connected to an output of the signal processor 44, wherein the output signal of the signal processer may be modified to compensate for a user's hearing impairment, and the signal processor 44 may provide the modified signal to the speaker 46. This connection may be established through the plug connector 12.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

1. A socket connector for a hearing device, the hearing device comprising a Behind-The-Ear (BTE) unit and a Receiver-In-the-Ear (RIE) unit, the BTE unit comprising a frame, wherein the frame comprises electronic components of the BTE unit, the RIE unit comprising a plug connector, the plug connector being configured for providing an electrical connection between the RIE unit and the BTE unit, wherein the socket connector is connectable to the frame of the BTE unit and wherein the socket connector is configured for detachably connecting the plug connector to the frame.

2. The socket connector according to item 1, wherein the socket connector is configured to fit with a plurality of different RIE units comprising the plug connector.

3. The socket connector according to item 1 or 2, wherein the plug connector comprises a locking element and the socket connector is configured for interacting with the locking element, and wherein the locking element is configured for locking the plug connector to or in the socket connector, when at least a part of the plug connector is arranged in the socket connector.

4. The socket connector according to any of the preceding items, wherein the socket connector is configured to fit with a plurality of different frames.

5. The socket connector according to any of the preceding items, wherein the socket connector comprises one or more attachment points for connection/interconnection/attachment/fixation to the frame.

6. The socket connector according to item 1, wherein the BTE unit comprises a housing and the socket connector is configured to fit with a plurality of different housings.

7. The socket connector according to any of the preceding items, wherein the socket connector is configured to be removably arranged in a hole in the housing.

8. The socket connector according to any of the preceding items, wherein the socket connector is configured for sealing against moisture and dirt, for protecting electronic components of the BTE unit and plug connector against corrosion.

9. The socket connector according to any of the preceding items, wherein the socket connector comprises a base element and at least one of a first sealing element or a second sealing element.

10. The socket connector according to item 9, wherein the first sealing element is configured for providing sealing between the housing and the socket connector and the second sealing element is configured for providing sealing between the plug connector and the socket connector.

11. The socket connector according to item 9 or 10, wherein the first sealing element and the second sealing element are integrated in one sealing part proving sealing between the housing and the sealing socket and between the plug connector and the socket connector.

12. The socket connector according to items 9 to 11, wherein the first sealing element and/or the second sealing element is/are adhesively and/or mechanically connected to the base element.

13. The socket connector according to items 9 to 11, wherein the first sealing element and/or the second sealing element is/are moulded to the base element.

14. The socket connector according to items 9 to 13, wherein the base element of the socket connector comprises inside walls and outside walls.

15. The socket connector according to item 14, wherein the inside walls of the base element form a hole in the socket connector and wherein the inside walls are pointing inwards towards the plug connector, when the plug connector is arranged in the hole of the socket connector, and wherein the outside walls of the base element are pointing towards the housing, when the socket connector is arranged in the hole in the housing.

16. The socket connector according to item 14 or 15, wherein the first sealing element and/or the second sealing element of the socket connector is/are arranged to at least partly or completely surround respectively the inside walls and the outside walls of the base element.

17. The socket connector according to item 14 to 16, wherein the first sealing element and/or the second sealing element of the socket connector is/are configured for providing a circumferential sealing respectively along the inside and outside walls of the base element of the socket connector.

18. The socket connector according to items 14 to 17, wherein sealing between the plug connector and the inside walls of the base element of the socket connector is provided by the second sealing element, and wherein sealing between the housing and the outside walls of the base element of the socket connector is provided by the first sealing element.

19. The socket connector according to items 9 to 18, wherein the base element and respectively the first sealing element and/or the second sealing element of the socket connector are made of different materials.

20. The socket connector according to items 9 to 19, wherein the first sealing element and/or the second sealing element is made of an elastomer, such as a thermoplastic elastomer, such as silicone.

21. The socket connector according to items 9 to 20, wherein the base element is made of plastic, such as fiber reinforced thermo-plastics.

22. A hearing device comprising:

a socket connector, a Behind-The-Ear (BTE) unit, the BTE unit comprising a frame, wherein the frame comprises electronic components of the BTE unit, and a Receiver-In-the-Ear (RIE) unit, the RIE unit comprising a plug connector, where the plug connector is configured for providing an electrical connection between the RIE unit and the BTE unit, wherein the socket connector is connectable to the frame of the BTE unit and wherein the socket connector is configured for detachably connecting the plug connector to the frame.

23. A hearing device according to item 22, wherein the socket connector is a socket connector according to any of the items 1 to 21.

LIST OF REFERENCES

2 socket connector
2*a* first end of socket connector
2*b* second end of socket connector
4 hearing device
6 Behind-The-Ear (BTE) unit
7 battery compartment
8 Receiver-In-the-Ear (RIE) unit
9 hole in housing
10 housing
10*a* bottom housing
10*b* top housing
11 electronic components of BTE unit
11*a* printed circuit board
11*b* second electrical connection interface
12 plug connector
12*a* first end of plug connector
12*b* second end of plug connector
13 upper free surface
14 base element
15 convex surface area
16 first sealing element
17 undercut in second end of socket connector
18 second sealing element
19 bottom surface of plug connector
20 inside walls of base element
22 outside walls of base element
24 hole in socket connector
25 frame
25*a* first frame unit
25*b* second frame unit
26 locking element
26*a* release knob
26*b* deadbolt
27, 27*a* hook of base element
28 surface between locking element and socket connector
29, 29*a* undercut in frame
30 guide
31 main body of plug connector
32 slot
33 undercut in first end of socket connector
34 bottom part of housing
35 top part of housing
36 front part of housing
37 rear part of housing
40 earpiece
40*a* dome
41 electrical wire/tube
42 microphone
44 signal processor
46 speaker
48 wireless communication unit
50 antenna

The invention claimed is:

1. A socket connector for a Behind-The-Ear (BTE) unit, the BTE unit comprising a housing containing electronic components, the socket connector comprising:

a base element;

a hole;

wherein at least a part of the socket connector is configured for placement in the housing of the BTE unit at a location that is between opposite ends of the housing, the opposite ends of the housing defining a longitudinal axis of the housing of the BTE unit, and wherein the hole of the socket connector is between the opposite ends of the housing of the BTE unit when the socket connector is coupled to the housing of the BTE unit;

wherein the hole of the socket connector is configured to allow the socket connector (1) to receive a first plug connector of a first Receiver-In-the-Ear (RIE) unit when the socket connector is not coupled with a second plug connector of a second RIE unit, and (2) to receive the second plug connector of the second RIE unit when the socket connector is not coupled with the first plug connector, the first RIE unit and the second RIE unit being different from each other.

2. The socket connector of claim 1, wherein the first RIE unit and the second RIE unit are of different respective types, of different respective brands, or of different respective generations.

3. The socket connector of claim 1, wherein the socket connector has a major length extending in a direction that is perpendicular to a center axis of the hole.

4. The socket connector of claim 1, wherein the socket connector is configured to mechanically connect to the housing of the BTE unit, or to a frame contained in the housing of the BTE unit.

5. The socket connector of claim 1, further comprising a guide configured to receive a wire or a tube extending from the first plug connector or from the second plug connector.

6. The socket connector of claim 1, wherein the socket connector is configured to interact with a locking element of the first RIE unit or the second RIE unit.

7. The socket connector of claim 1, further comprising a first sealing element, wherein the first sealing element is configured to seal against the housing of the BTE unit and/or a frame of the BTE unit.

8. The socket connector of claim 7, further comprising a second sealing element, wherein the second sealing element is configured to seal against the first plug connector or the second plug connector.

9. The socket connector of claim 8, wherein the first sealing element and the second sealing element are integrated into one component.

10. The socket connector of claim 8, wherein the base element of the socket connector comprises an inner wall surface and an outer wall surface;

wherein the first sealing element of the socket connector is along the inner wall surface of the base element of the socket connector; and wherein the second sealing element of the socket connector is along the outer wall surface of the base element of the socket connector.

11. The socket connector of claim 1, wherein the socket connector is configured to fit with another BTE unit when the socket connector is not placed in the housing of the BTE unit, and wherein the BTE unit and the other BTE unit have different respective configurations.

12. The socket connector of claim 11, wherein the other BTE unit has a housing, wherein the housing of the BTE unit and the housing of the other BTE housing are different from each other, and wherein the socket connector is configured to alternatively fit with the housing of the BTE unit and with the housing of the other BTE unit.

13. The socket connector of claim 11, wherein the BTE unit has a first frame, wherein the other BTE unit has a second frame, wherein the first frame of the BTE unit and the second frame of the other BTE housing are different from each other, and wherein the socket connector is configured to alternatively fit with the first frame of the BTE unit and with the second frame of the other BTE unit.

14. A socket connector comprising:

a base element;

a hole configured to receive a first plug connector of a first Receiver-In-the-Ear (RIE) unit;

wherein at least a part of the socket connector is configured for placement in a first housing of a first Behind-The-Ear (BTE) unit at a location that is between opposite ends of the first housing, the opposite ends of the housing defining a longitudinal axis of the housing of the first BTE unit, and wherein the hole of the socket connector is between the opposite ends of the housing of the first BTE unit when the socket connector is coupled to the housing of the first BTE unit;

wherein the socket connector is configured to fit with a first housing of a first BTE unit when the socket connector is not coupled with a second BTE unit, and wherein the socket connector is configured to fit with the second housing of the second BTE unit when the socket connector is not coupled with the first BTE unit, the first BTE unit and the second BTE unit being different from each other.

15. The socket connector of claim 14, wherein the first BTE unit and the second BTE unit are of different respective types, of different respective brands, or of different respective generations.

16. The socket connector of claim 14, wherein the socket connector has a major length extending in a direction that is perpendicular to a center axis of the hole.

17. The socket connector of claim 14, wherein the socket connector is configured to mechanically connect to the first housing of the first BTE unit, or to a frame contained in the first housing of the first BTE unit.

18. The socket connector of claim 14, further comprising a guide configured to receive a wire or a tube extending from the first plug connector of the first RIE unit.

19. The socket connector of claim 14, wherein the socket connector is configured to interact with a locking element of the first RIE unit.

20. The socket connector of claim 14, further comprising a first sealing element, wherein the first sealing element is configured to (1) seal against the first housing of the first BTE unit and/or a frame of the first BTE unit, or (2) seal against the second housing of the second BTE unit and/or a frame of the second BTE unit.

21. The socket connector of claim 20, further comprising a second sealing element, wherein the second sealing element is configured to seal against the first plug connector.

22. The socket connector of claim 21, wherein the first sealing element and the second sealing element are integrated into one component.

23. The socket connector of claim 21, wherein the base element of the socket connector comprises an inner wall surface and an outer wall surface;

wherein the first sealing element of the socket connector is along the inner wall surface of the base element of the socket connector; and wherein the second sealing element of the socket connector is along the outer wall surface of the base element of the socket connector.

24. The socket connector of claim 14, wherein the first housing of the BTE unit and the second housing of the second BTE housing are different from each other, and wherein the socket connector is configured to alternatively fit with the first housing of the BTE unit and with the second housing of the second BTE unit.

25. The socket connector of claim 14, wherein the first BTE unit has a first frame, wherein the second BTE unit has a second frame, wherein the first frame of the first BTE unit and the second frame of the second BTE housing are different from each other, and wherein the socket connector is configured to alternatively fit with the first frame of the first BTE unit and with the second frame of the second BTE unit.

26. A hearing device comprising the socket connector of claim 14, and the first plug connector of the first RIE unit, wherein the first plug connector comprises:

a main body configured for placement in an opening of the first housing of the first BTE unit;

a wall part above the main body, wherein a surface of the wall part is along a longitudinal side of the first BTE unit when the plug connector is coupled to the first BTE unit; and a release knob above the wall part, wherein the release knob is operable to release the plug connector from the first BTE unit.

27. A plug connector for a receiver-in-the-ear (RIE) unit, the RIE unit comprising an earpiece and a tube coupled to the earpiece, the plug connector comprising:

a first end and a second end opposite from the first end, wherein the second end of the plug connector is configured to couple to the tube; and a locking element with an anchor located closer to the second end of the plug connector than to the first end of the plug connector;

wherein the plug connector is configured to couple with a first behind-the-ear (BTE) unit when the plug connector is not coupled with a second BTE unit, and to couple with the second BTE unit when the plug connector is not coupled with the first BTE unit, the first BTE unit and the second BTE unit being different from each other.

28. The plug connector of claim 27, wherein the first BTE unit and the second BTE unit are of different respective types, of different respective brands, or of different respective generations.

29. The plug connector of claim 27, wherein the plug connector is configured to alternately couple with a first socket connector of the first BTE unit, and with a second socket connector of the second BTE unit.

30. The plug connector of claim 29, wherein the first socket connector of the first BTE unit and the second socket connector of the second BTE unit are different from each other.

31. The plug connector of claim 29, wherein the first socket connector of the first BTE unit and the second socket connector of the second BTE unit have a same configuration.

32. The plug connector of claim 31, wherein the first BTE unit has a first frame, and the second BTE unit has a second frame, and wherein the first frame of the first BTE unit and the second frame of the second BTE unit are different from each other.

33. The socket connector of claim 1, wherein the hole of the socket connector is along a longitudinal side of the housing of the BTE unit when the socket connector is coupled to the housing of the BTE unit.

34. The socket connector of claim 14, wherein the hole of the socket connector is along a longitudinal side of the housing of the first BTE unit when the socket connector is coupled to the housing of the first BTE unit.

* * * * *